(12) United States Patent
Cuprys

(10) Patent No.: US 7,310,071 B2
(45) Date of Patent: Dec. 18, 2007

(54) INSTRUMENT PANEL WITH ACTIVE DISPLAY

(75) Inventor: Lawrence M. Cuprys, Felton, CA (US)

(73) Assignee: Kopin Corporation, Taunton, MA (US)

( * ) Notice: Subject to any disclaimer, the term of this patent is extended or adjusted under 35 U.S.C. 154(b) by 547 days.

(21) Appl. No.: 10/688,803

(22) Filed: Oct. 17, 2003

(65) Prior Publication Data

US 2004/0140948 A1    Jul. 22, 2004

Related U.S. Application Data

(60) Provisional application No. 60/419,875, filed on Oct. 18, 2002.

(51) Int. Cl.
*G09G 5/00* (2006.01)

(52) U.S. Cl. ............................................ 345/7; 345/32

(58) Field of Classification Search ................ 345/7–9, 345/32; 359/630; 353/30, 34
See application file for complete search history.

(56) References Cited

U.S. PATENT DOCUMENTS

| | | | |
|---|---|---|---|
| 4,926,331 A | 5/1990 | Windle et al. | |
| 5,428,265 A | 6/1995 | Booth, Jr. et al. | |
| 5,618,096 A | 4/1997 | Parker et al. | |
| 5,661,454 A | 8/1997 | Bezard et al. | |
| 5,703,625 A | 12/1997 | Snider et al. | |
| 5,865,529 A * | 2/1999 | Yan | |
| 5,917,459 A * | 6/1999 | Son et al. | 345/7 |
| 6,067,492 A | 5/2000 | Tabata et al. | |
| 6,317,172 B1 | 11/2001 | Huynh | |
| 6,350,041 B1 * | 2/2002 | Tarsa et al. | |
| 6,381,519 B1 | 4/2002 | Snyder | |
| 6,428,198 B1 | 8/2002 | Saccomanno et al. | |
| 6,486,856 B1 | 11/2002 | Zink | |
| 6,631,370 B1 | 10/2003 | Pekkanen | |
| 6,636,370 B2 | 10/2003 | Freeman | |
| 6,894,729 B2 * | 5/2005 | Hirata et al. | |
| 6,945,652 B2 * | 9/2005 | Sakata et al. | |
| 7,034,778 B1 * | 4/2006 | Hahl | 345/7 |
| 2002/0003592 A1 | 1/2002 | Hett et al. | |
| 2002/0005778 A1 | 1/2002 | Breed et al. | |
| 2002/0041273 A1 | 4/2002 | Dirksen et al. | |
| 2003/0025799 A1 | 2/2003 | Holz et al. | |
| 2003/0137433 A1 | 7/2003 | Schiller et al. | |
| 2003/0179109 A1 | 9/2003 | Chamas et al. | |
| 2004/0066547 A1 * | 4/2004 | Parker et al. | 345/7 |

* cited by examiner

*Primary Examiner*—Regina Liang
(74) *Attorney, Agent, or Firm*—Hamilton, Brook, Smith & Reynolds, P.C.

(57) ABSTRACT

An instrument panel including at least one instrument indicator positioned in the panel. At least one active display is positioned in the panel and is capable of displaying images from data provided to the display.

32 Claims, 8 Drawing Sheets

INSTRUMENT PANEL WITH ACTIVE DISPLAY

RELATED APPLICATION

This application claims the benefit of U.S. Provisional Application No. 60/419,875, filed Oct. 18, 2002. The entire teachings of the above application are incorporated herein by reference.

BACKGROUND

Dashboards of motor vehicles such as a passenger car often include gauges, for example, a speedometer/odometer for indicating vehicle speed and mileage, and a tachometer for indicating the revolutions per minute of the engine. Other gauges are also typically included such as gas level and coolant temperature gauges. In addition, the dashboard usually has indicator lights and/or icons to provide information on other conditions of the vehicle such as whether a door is ajar, or to check the oil level. Such gauges, icons and indicator lights are discrete or individual items that are arranged in the dashboard each in its own particular location. Consequently, the more gauges, icons and indicator lights that a dashboard has, the larger and/or more cluttered the dashboard becomes.

SUMMARY

The present invention provides an instrument panel with at least one active display which can minimize the size and simplify the overall appearance of the instrument panel.

In particular embodiments, the instrument panel can include at least one instrument indicator positioned in the panel. At least one active display can be positioned in the panel and be capable of displaying images from data provided to the display.

The images can include icons, video images, animation and instrument information. Such images can be changeable. The at least one active display can have a liquid crystal display and a screen onto which images are projected from the liquid crystal display. At least one light source illuminates the liquid crystal display. The at least one light source can be at least one light emitting diode (LED). The LED can be positioned near a hollow lens which collects light emitted by the LED and directs the collected light to the liquid crystal display. In one embodiment, the at least one instrument indicator and the at least one active display in the instrument panel are both simultaneously displayed by an active display system. The active display system can be formed from an arrangement of multiple active display devices. The instrument panel can be a vehicle display panel such as in a dashboard in a motor vehicle.

The present invention also provides a display system including a display device for providing images and a first light source for emitting light. A first light collection lens system can include a hollow lens which collects the light emitted from the first light source and directs the light in a first beam of light to the display device for illuminating the images on the display device for viewing.

In particular embodiments, the display device can be an active liquid crystal display and the first light source can be an LED. The hollow lens can be substantially spherical in shape with an opening on one side and spherically shaped inner and outer surfaces with centers that can be offset from each other. A projection lens can project images from the liquid crystal display onto a screen for displaying the projected images. The first light collection lens system can further include a condenser lens positioned adjacent to the hollow lens for further condensing the first beam of light. A dispersion lens can be positioned adjacent to the liquid crystal display for dispersing the first beam of light on the liquid crystal display.

In further embodiments, the display system can include a second light source having an LED for emitting light. The light from the first and second light sources can be of different colors. A second light collection lens system can have a hollow lens which collects the light emitted from the second light source and directs the light in a second beam of light. The second light collection lens system can also include a condenser lens positioned adjacent to the hollow lens for further condensing the second beam of light. A beam splitter can direct the second beam of light through the dispersion lens to the liquid crystal display.

In such embodiments a mirror can be employed to direct images projected by the projection lens onto the screen. One of the first and second light sources can emit green light at about 530 nm and the other can emit red light at about 645 nm. The display system is contained within a housing. The housing can be about 3.5 inches long, 1.5 inches high and 1 inch wide. The screen can be about 1×1.3 inches and the displayed images can have a dimension of at least 3×4 inches. By changing the projection lens and the power in the light, the screen size may be adjusted to various desired sizes.

In still further embodiments, the display system can also include a third light source having an LED for emitting light. The light from the first, second and third light sources can be of different colors, for example, green, red and blue, respectively. A third light collection lens system can have a hollow lens which collects the light emitted from the third light source and directs the light in a third beam of light. The third light collection lens system can also include a condenser lens positioned adjacent to the hollow lens for further condensing the third beam of light. The beam splitter can additionally direct the third beam of light through the dispersion lens to the liquid crystal display.

BRIEF DESCRIPTION OF THE DRAWINGS

The foregoing and other objects, features and advantages of the invention will be apparent from the following more particular description of embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
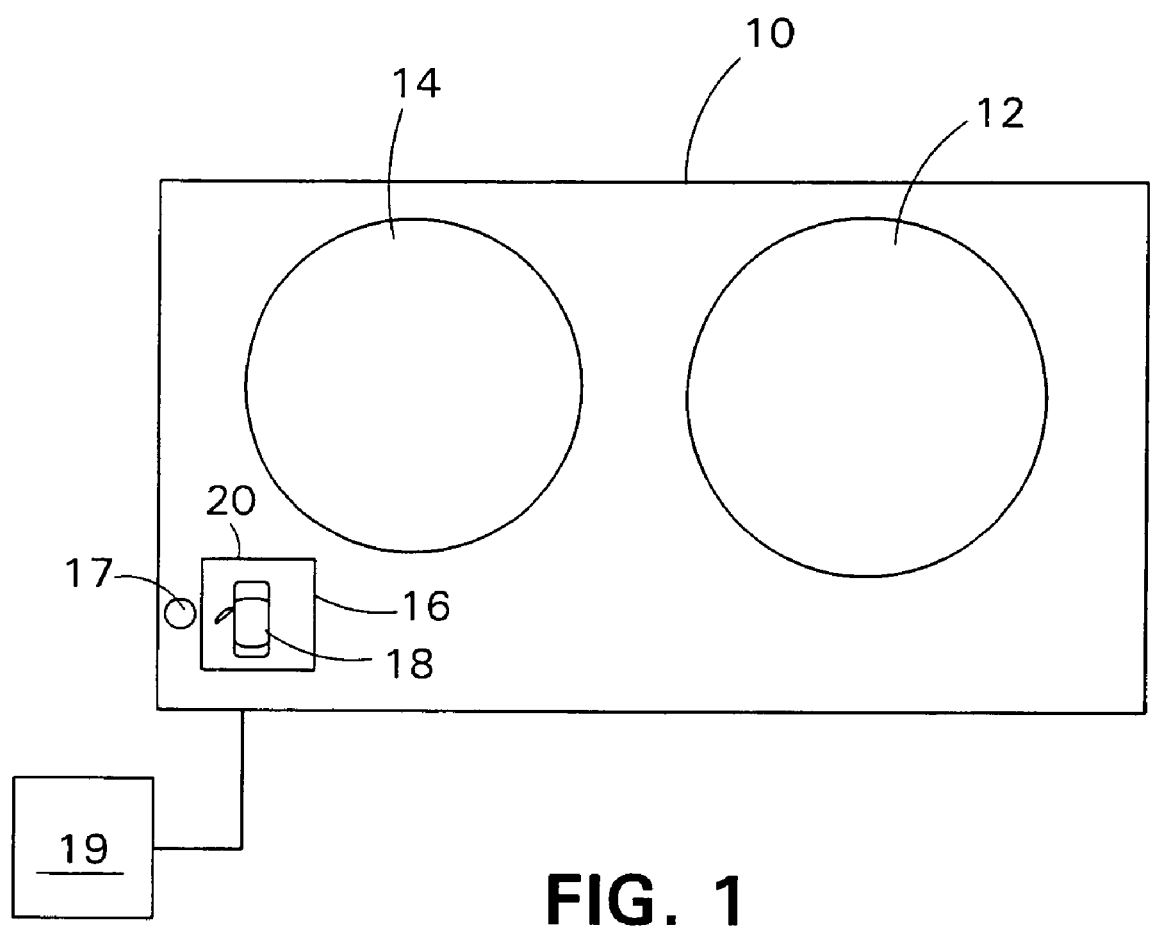
FIG. 1 is a simplified front view of an embodiment of an instrument panel in accordance with the present invention.

Referring to FIG. 1, instrument panel 10 is an embodiment of the present invention which can be for example, in a dashboard panel of a motor vehicle. Instrument panel 10 has one or more instruments or gauges, such as a tachometer 14 and a speedometer/odometer 12. If desired, instrument panel 10 can include additional gauges or indicators to those shown. An active display 20 is mounted in instrument panel 10 for displaying a variety of images as desired on a screen 16. The active display 20 and the images displayed thereon are controlled by a controller 19.

The images displayed on active display 20 can include information such as GPS navigation data, maps, travel information, directions, vehicle information, inside/outside temperature, miscellaneous text, etc. The images can also include a number of icons providing vehicle status, such as the door ajar icon 18 depicted in FIG. 1. Other typical icons can include, for example, icons indicating overheating, check oil, out of fuel, seat belt, etc. Such icon images can be a still image or can involve moving animation. In addition, the images can have more than one color. The active display 20 can also display operating representations of desired gauges, such as an oil pressure gauge, fuel gauge, etc. Operating representations of gauges that are already in the instrument panel 10 can be available to provide redundancy so that if an actual gauge becomes inoperable, for example, the speedometer 12, the vehicle speed can still be monitored on a representation of the speedometer displayed on the active display 20. In addition, video images can also be displayed on active display 20. The video images can be stored images or can be real time images from a camera, for example, positioned in a blind spot for backup purposes or in a forward position for police vehicles. Further-more, computer and wireless capabilities can be displayed on the active display 20.

A selector 17 can be provided to change the images displayed on active display 20 or to change the operational mode even while the vehicle having instrument panel 10 is being operated. An operational mode can be chosen to display a single image or a sequence of information and/or images corresponding to the operation of the vehicle. In addition, another operational mode can be chosen where images will appear as necessary, for example, a low fuel icon or an engine overheating icon. In operation, the size, color and types of the images can change, with the images morphing into different images as situations change.

By being capable of providing multiple functional images on active display 20, the size and visual complexity of an instrument panel 10 can be minimized while at the same time, providing increased capabilities. The same active display 20 can be mounted into different model motor vehicle dashboards which can be from different manufacturers. The necessary capabilities for each particular dashboard can be stored in memory in controller 19. For example, the capabilities required for a luxury car will be different than the capabilities required for an economy model.

Although instrument panel 10 has been described as being in a dashboard of a motor vehicle, it is understood that instrument panel 10 can be employed in a variety of different powered craft applications, including watercraft, aircraft, spacecraft, submersibles, etc. In addition, motor vehicle uses include cars, trucks and buses, as well as construction or excavation equipment, motorcycles, scooters, the Segway™, etc. Other uses can be stationary, such as in facility control panels, machine or equipment control panels, vending machines, etc. Furthermore, embodiments of instrument panel 10 can be used in wind or human powered vehicles such as sailing vessels, bicycles, etc., and provide data on the rider or operator, as well as the vehicle or craft.

Figure 2:
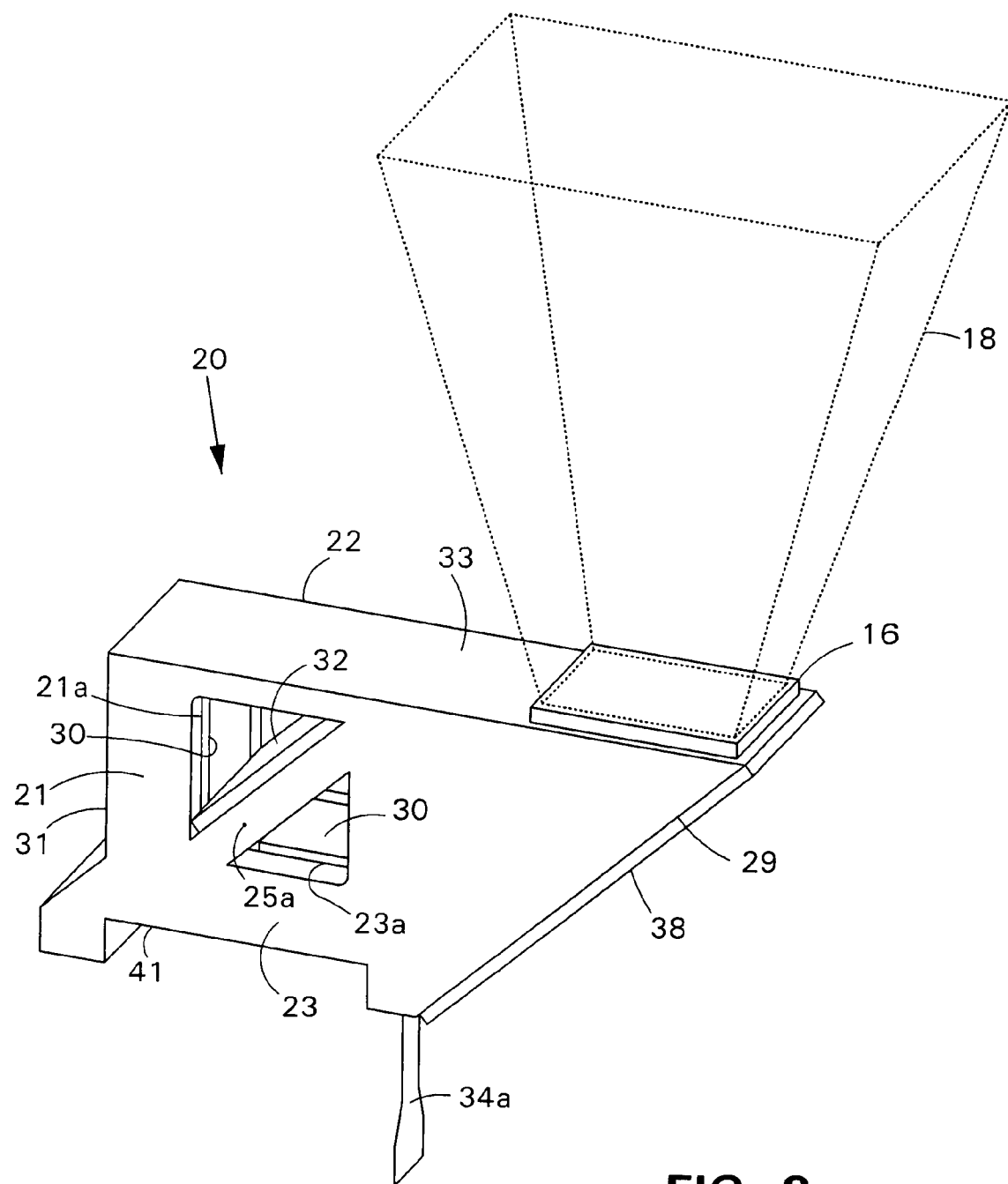
FIG. 2 is a side perspective view of an embodiment of a projection display in accordance with the present invention.
Figure 3:
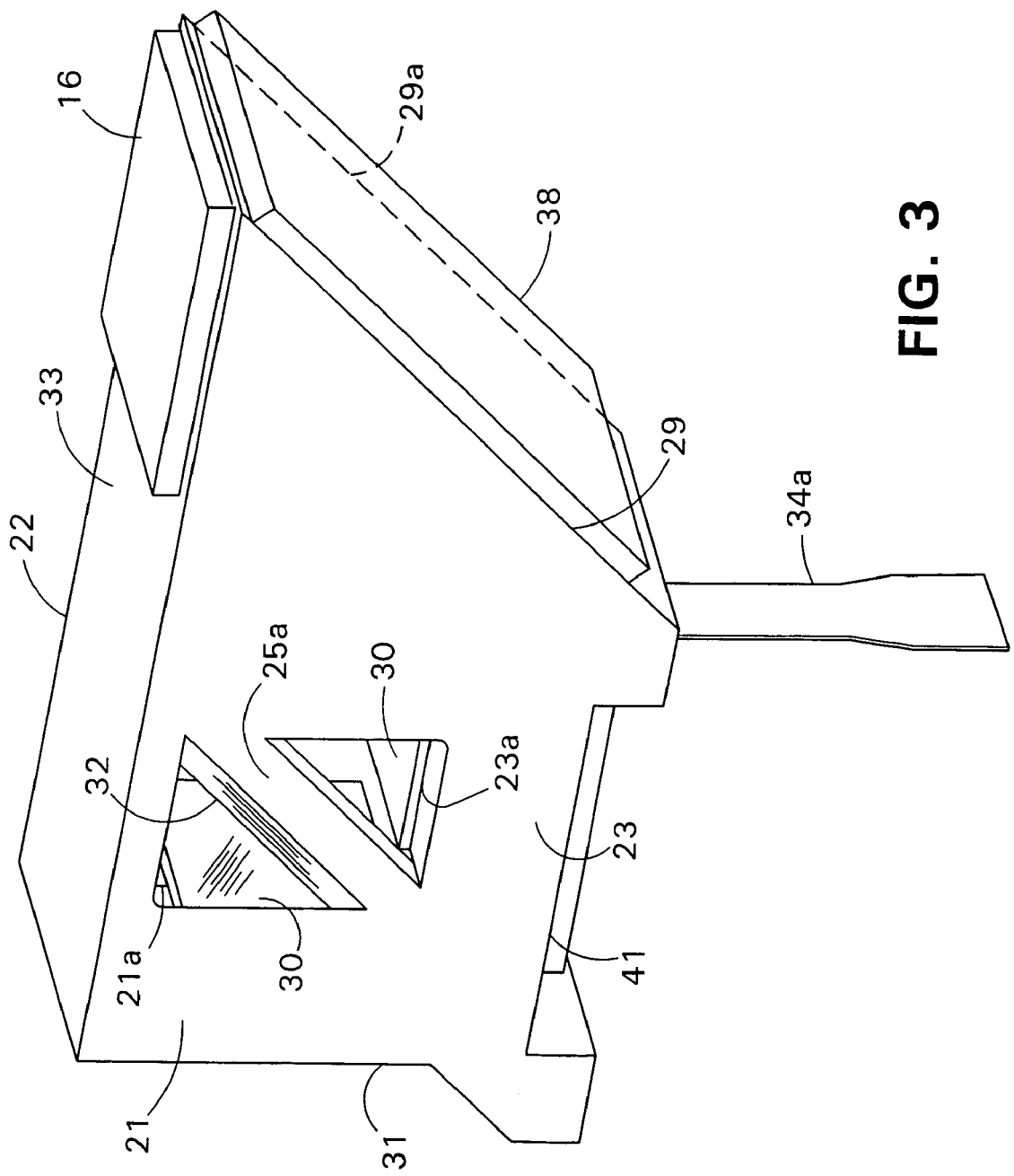
FIG. 3 is a frontal perspective view of the projection display of FIG. 2.
Figure 4:
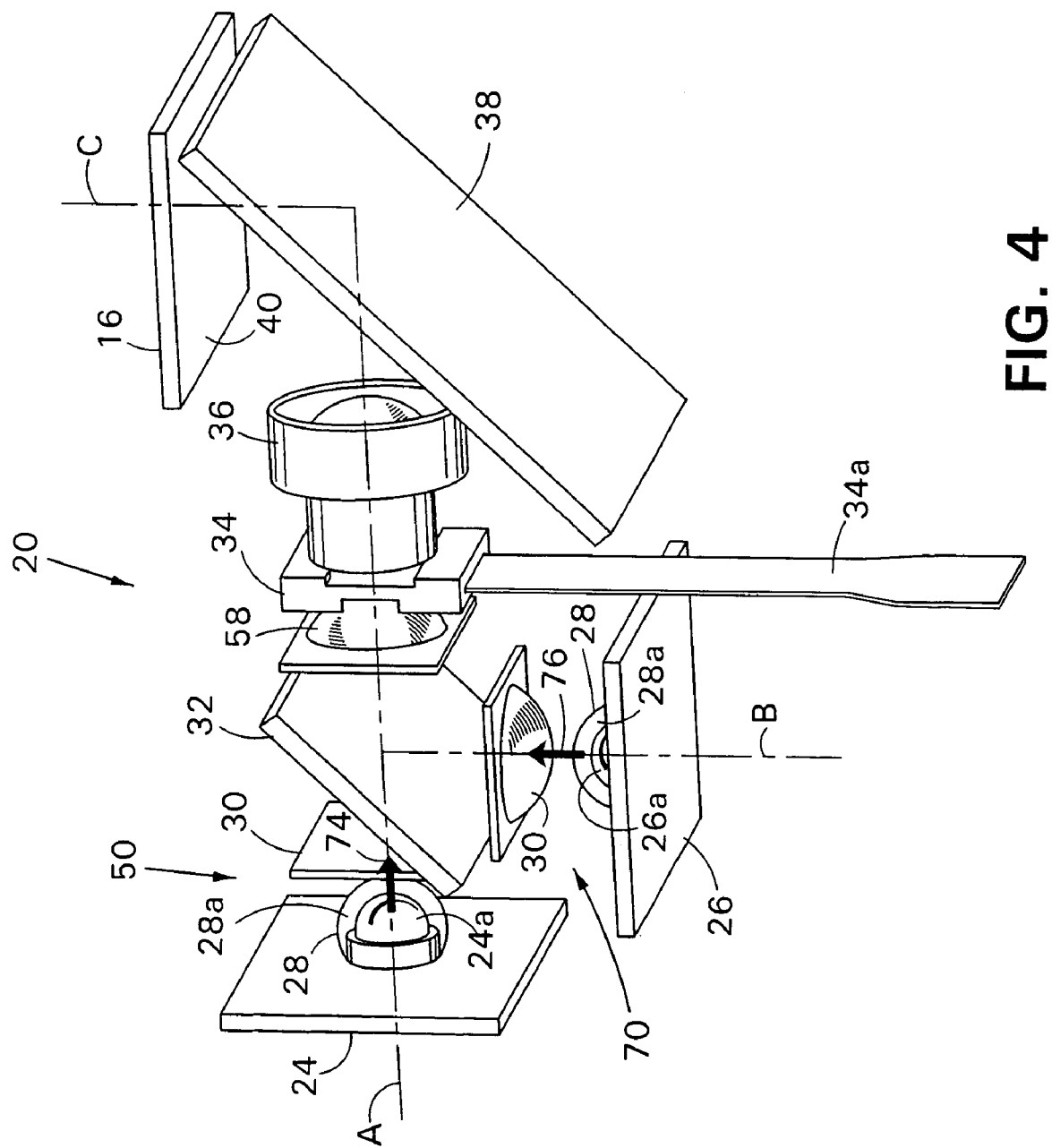
FIG. 4 is a perspective view of the projection display of FIG. 2 with the housing omitted.
Figure 5:
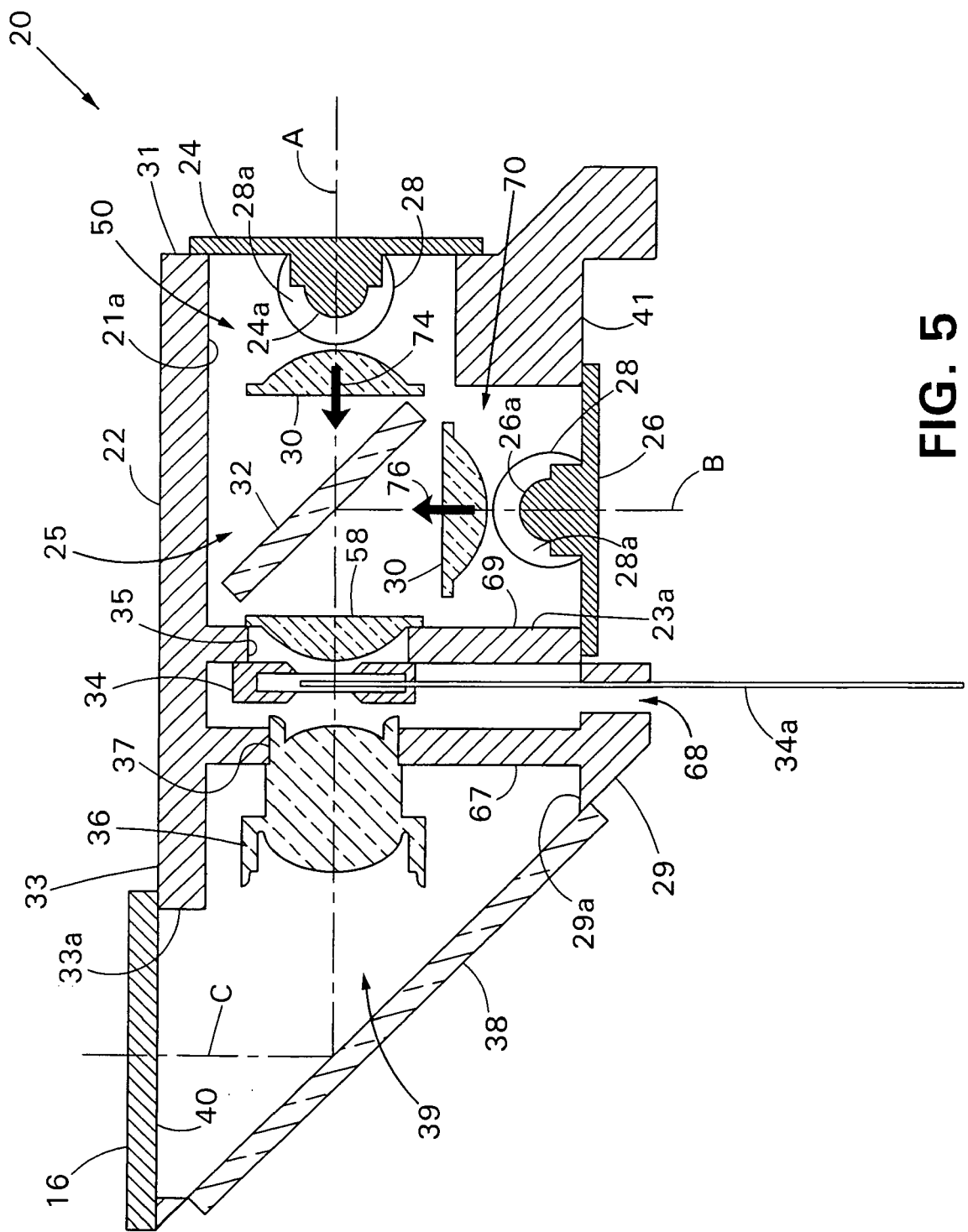
FIG. 5 is a side sectional view of the projection display of FIG. 2.

Referring to FIGS. 2-5, in one embodiment, active display 20 is a two color projection display having a housing 22 with first 24 and second 26 light sources mounted therein (FIGS. 4 and 5). The two light sources 24 and 26 are typically LEDs of two different colors which are mounted over openings 21a and 23a at the rear 31 and bottom 41 of the housing 22 on respective optical axes A and B, usually at right angles to each other. The first 24 and second 26 light sources have light emitting portions 24a and 26a which extend into the openings 21a and 23a, each for emitting light which is directed on optical axis A for illuminating the display surfaces of an active liquid crystal display (LCD) 34 and the images formed thereon. The LCD 34 is positioned within an opening 35 in a wall 69 located in the interior of housing 22. The images illuminated on LCD 34 are projected by a projection lens 36 onto screen 16. The projection lens 36 is positioned within an opening 37 in a wall 67 located in the interior of housing 22 adjacent to LCD 34. Screen 16 is positioned over an opening 33a in the top 33 of housing 22. A mirror 38 can be positioned over an opening 29a at the angled front surface 29 of housing 22. The mirror 38 is positioned at an angle (typically about 45°) for folding the optics by redirecting the images projected by projection lens 36 along optical axis A onto optical axis C (typically at about 90° to axis A) and onto Screen 16.

A more detailed discussion of active display 20 now follows. The first light source 24 can be green with a wavelength of about 530 mm and the second light source can be red with a wavelength of about 645 mm. In one embodiment, the LED light sources 24 and 26 are Part Nos. LXHL-MM1A and LXHL-MD1B from Lumileds Lighting, LLC of San Jose, Calif. When light sources 24 and 26 are LEDs, the light sources and the active display 20 can be low power.

Figure 6:
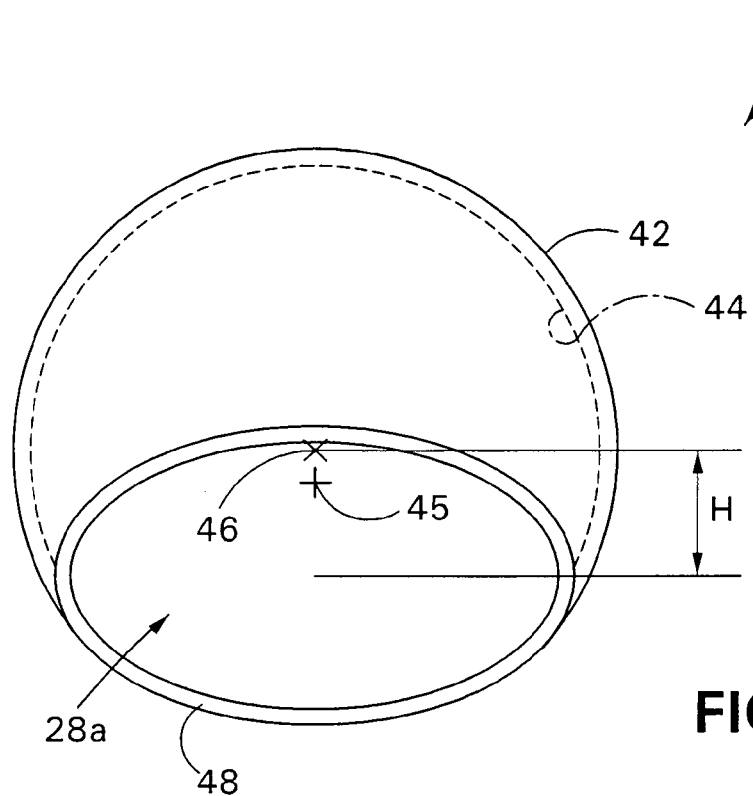
FIG. 6 is a perspective view of a hollow lens.

In order to direct a sufficient amount of light from light sources 24 and 26 to LCD 34, light collection lens systems are typically employed. The first light collection lens system 50 for the first light source 24 includes a substantially spherical hollow lens 28 positioned in front of the light emitting portion 24a of the first light source 24 on optical axis A. Typically, the light emitting portion 24a is extended within the interior 28a of the hollow lens 28. The hollow lens 28 typically has spherically shaped inner 44 and outer 42 surfaces (FIG. 6) wherein the centers can be coincident or slightly offset from each other along the optical axis A, depending upon the situation at hand. When the centers are offset, the center 46 of the outer surface 42 can be forward of the center 45 of the inner surface 44, as shown, which bulges the outer surface 42 slightly forward relative to inner surface 44 along the optical axis A. Hollow lens 28 is about a ¾ sphere with the bottom quarter removed by cutting, thereby forming a circular bottom rim 48. Hollow lens 28 is also known as a hyperspheroid lens. Normally, the best location for the light source 24 can be found by placing the light emitting portion 24a at the optical center of the lens 28 and then moving the light source 24 backwards until the desired beam is formed. The hollow lens 28 collects or shapes light emitted in a hemisphere pattern from the light emitting portion 24a of the first light source 24 and directs the light in a first beam of light 74 along optical axes A towards the LCD 34 for efficient transmission. In one embodiment, hollow lens 28 has an outer surface 42 with a diameter of about 10 mm, rim 48 is about 2.5 mm from the center 46 of outer surface 42, and centers 45 and 46 can be offset by about 0.0 to 0.1 mm.

In the embodiment depicted in FIGS. 2-5, the first beam of light 74 when leaving hollow lens 28 is slightly diverging (in a diverging cone) so that the first light collection system 50 for light source 24 also includes a condenser lens 30 positioned adjacent to hollow lens 28 along optical axis A and mounted within opening 21a between rear side portions 21 of housing 22 (FIGS. 2 and 3). Condenser lens 30 further condenses the first beam of light 74 into a converging beam or cone. The first beam of light 74 passes a beam splitter 32 positioned within the rear cavity 25 of housing 22 and mounted between side members 25a. Beam splitter 32 will be discussed later with respect to the second light source 26. The condensed first beam of light 74 is then dispersed onto the display surfaces of LCD 34 by a dispersion lens 58 mounted within opening 35 in front of LCD 34 along optical axis A.

A second light collection lens system 70 is associated with the second light source 26 and is similar to the first light collection system 50. The second light collection system 70 also includes a substantially spherical hollow lens 28 which is similarly positioned in front of the light emitting portion 26a of the second light source 26 but on optical axis B with the light emitting portion 26a extending within the interior 28a of the hollow lens 28 for collecting the light emitted from the light emitting portion 26a of the second light source 26 and directing the light along optical axis B in a slightly diverging second beam of light 76. The second light collection lens system for light source 26 also includes a condenser lens 30 positioned adjacent to hollow lens 28 along optical axis B and mounted within opening 23a between lower side portions 23 of housing 22 (FIGS. 2 and 3) for further condensing the slightly diverging second beam of light 76 into a converging beam. Beam splitter 32 is angled to direct the condensed second beam of light 76 from optical axis B onto optical axis A in the same direction as the first beam of light 74. Beam splitter 32 reflects the wavelength of light from the second light source 26 (along axis B) and transmits the wavelength of light from the first light source 24 (along axis A). When axes A and B are at about right angles (90°) to each other, beam splitter 32 is positioned at about a 45° angle relative to axis B. The second beam of light 76 is then dispersed by dispersion lens 58 onto the display surfaces of LCD 34. Consequently, LCD 34 is backlit by two different colored light sources 24 and 26. Two colors can be simultaneously provided to LCD 34 or one color can be selected at a particular time. Typically, there is no color separation.

The images formed on LCD 34 are controlled by Controller 19. The LCD 34 is connected to controller 19 by a cable 34a extending from LCD 34 through which data travels from controller 19 to LCD 34. The cable 34a extends from the bottom of housing 22 through a passage 68 between walls 67 and 69 (FIG. 5). Depending upon the location of controller 19, cable 34a can be connected directly to controller 19 or through intermediary components. In one embodiment the LCD 34 is a QVGA display, part No. KCD-QD01-BA from Kopin Corporation of Taunton, Mass., having display surfaces with a pixel array of 320×240 pixels.

In other embodiments, LCD 34 can be larger, for example, 640×480 pixels, 1280×1024 pixels, etc.

The projection lens 36 can be a fixed lens where the size of the projected image on screen 16 is chosen by selecting the magnification of the lens 36. Alternatively, projection lens 36 can be a zoom lens which can be controlled by controller 19 for changing the size of the images on screen 16 during operation, as required or desired. The resulting viewed image brightness is about 200-300 fL. or brighter. Typically, the images are bright enough to be viewable even in a sunlight environment, such as in a dashboard of a motor vehicle during the day. Sensors communicating with controller 19 can be employed for controlling the brightness to adjust for changing environments. The housing 32 can be made in a compact fashion, for example, about 3.5 inches long, 1.5 inches high, and 1 inch wide. In such a housing 22, the screen 16 can be about 1×1.3 inches with the displayed images having dimensions of at least 3×4 inches.

The screen 16 can be of a number of different configurations or materials, depending upon the application. For example, in the embodiment depicted in FIGS. 2-5, a fresnel lens 40 is positioned before screen 16, typically about 1 mm apart, for use when the projection angle is high. The fresnel lens 40 redirects the angled projected light to hit the back of the screen 16 at more of a right angle relative to the screen 16. Alternatively, if the projection angle is low, the fresnel lens 40 can be omitted. The screen material or configuration can also be chosen for obtaining the desired screen viewing angle, appearance, contrast or light transmission. One possible screen has beaded material on glass with an epoxy matrix. Another possible screen is clear with stipples or bumps to reduce the glare.

Figure 7:
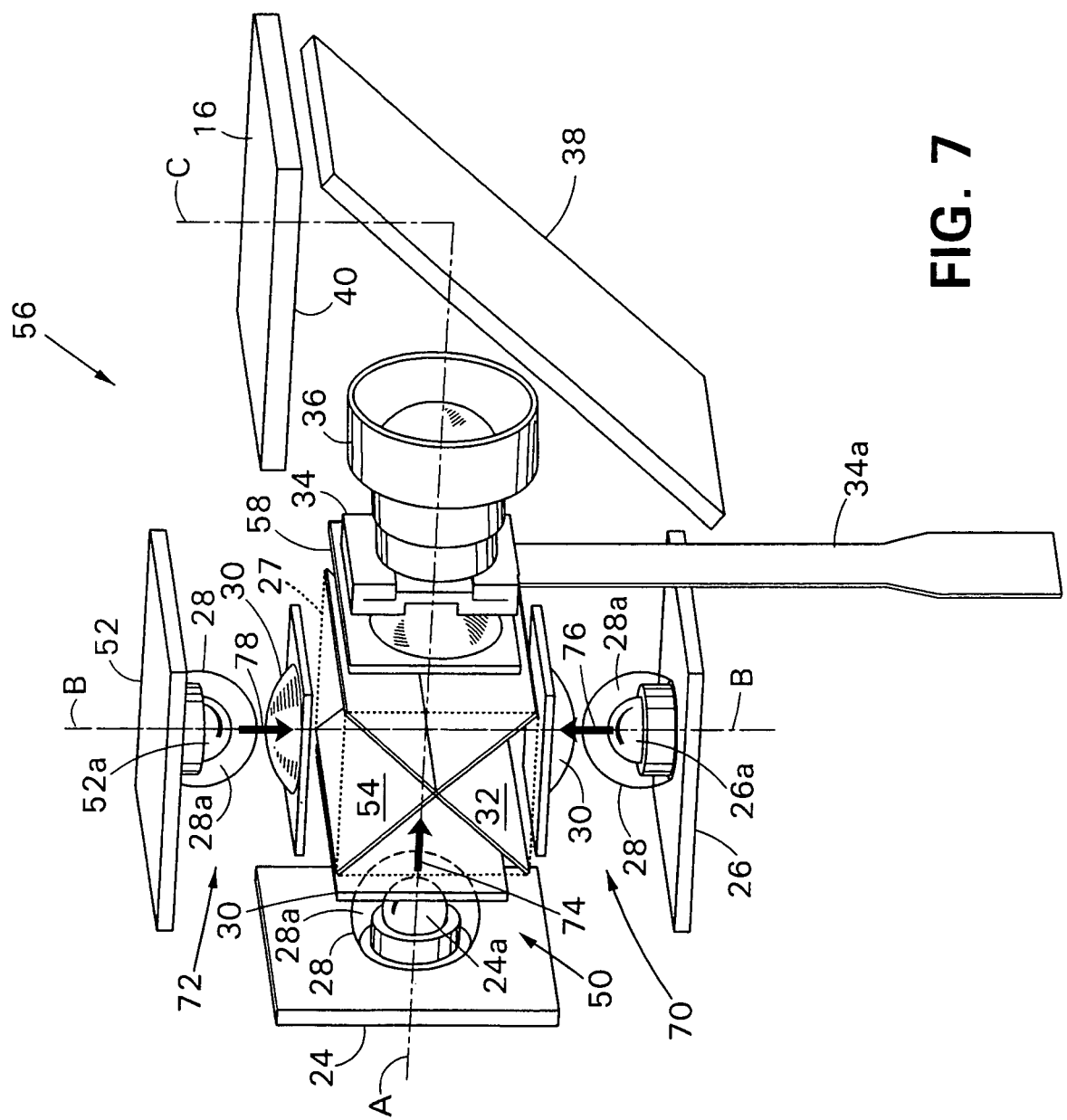
FIG. 7 is a perspective view of another embodiment of a projection display in accordance with the present invention with the housing omitted.

Referring to FIG. 7, active display 56 is an embodiment of another preferred display for instrument panel 10 and is a three color projection display. Active display 56 differs from active display 20 in that display 56 further includes a third light source 52 with a light emitting portion 52a and a third light collection lens system 72 positioned along optical axis B on the opposite side of optical axis A from the second light source 26 and the second light collection lens system 70 for directing a third beam of light 78 along optical axis B in the opposite direction to the second beam of light 76. The third light collection lens system 72 is similar to the first 50 and second 70 light collection lens systems. In addition, the display 56 includes an X-cube beam splitter 27 having both beam splitter 32 and a beam splitter 54, for directing the three beams of light 74, 76 and 78 in the same direction onto a common optical axis A. The first beam of light 74 from the first light source 24 and first light collection lens system 50 passes through X-cube beam splitter 27 along optical axis A through dispersion lens 58 to LCD 34. The second beam of light 76 from the second light source 26 and second light collection lens system 70 is redirected by beam splitter 32 from optical axis B onto optical axis A, through dispersion lens 58 to LCD 34. The third light collection lens system 72 collects the light emitted by the third light source 52 in a similar manner to that as light collection lens systems 50 and 70 and directs the third beam of light 78 along optical axis B into X-cube beam splitter 27. Beam splitter 54 of X-cube beam splitter 27 is angled (about 45°) to redirect or reflect the third beam of light 78 from the optical axis B onto optical axis A and through dispersion lens 58 to LCD 34. Images illuminated on the display surfaces of LCD 34 are then projected by projection lens 36 onto screen 16 via mirror 38. When the light sources 24, 26 and 52 are green, red and blue LEDS, respectively, the third light source can be Lumiled's part No. LXHL-MB1A. Typically, LCD 34 is driven in color sequential fashion and there is no spatial separation for the colored pixels. Image brightness is at least about 200 fL.

Figure 8:
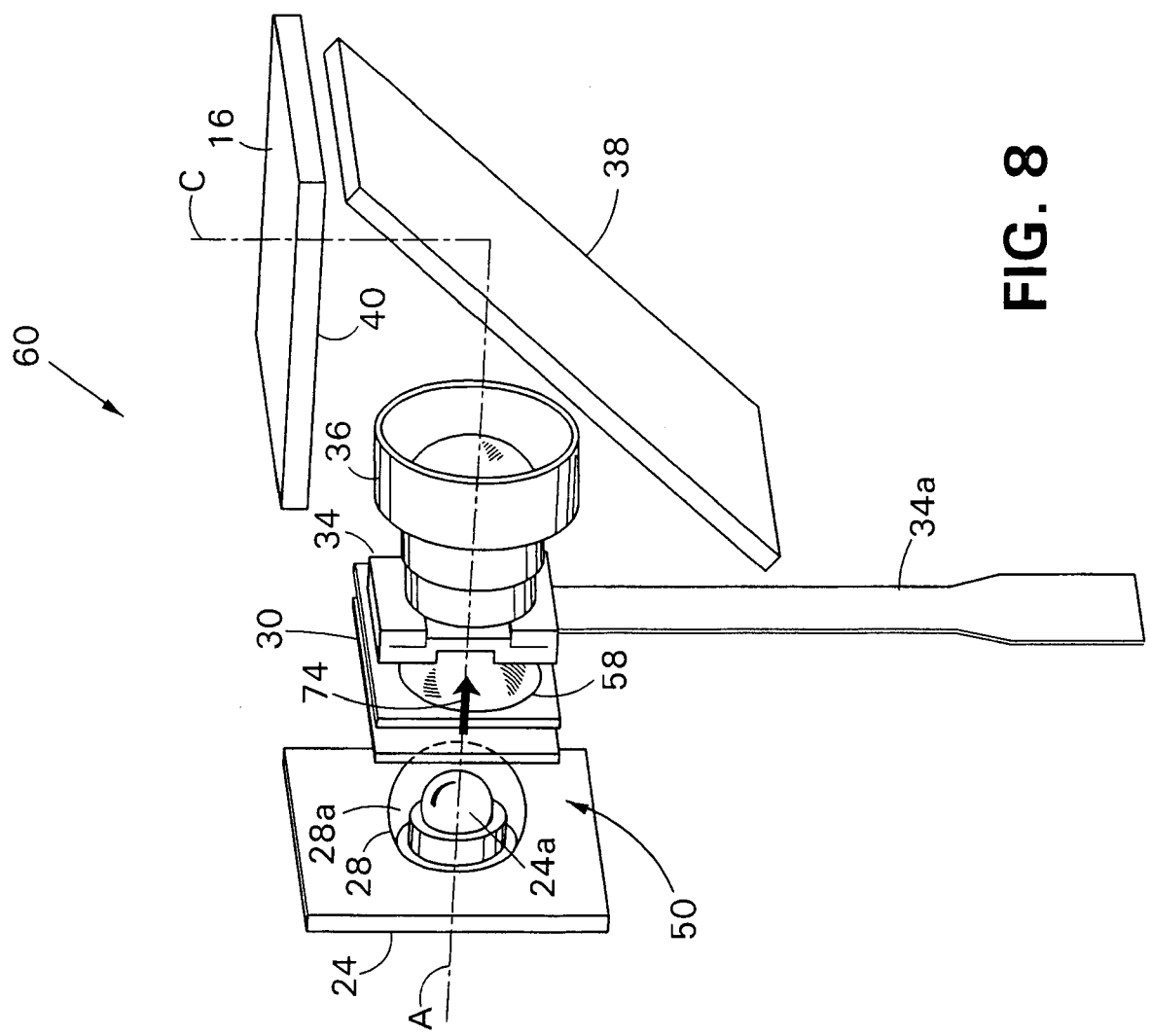
FIG. 8 is a perspective view of yet another embodiment of a projection display in accordance with the present invention with the housing omitted.

Referring to FIG. 8, active display 60 is an embodiment of another preferred display for instrument panel 10 and is a projection display having a single light source 24 and light collection system 50 for directing a first beam of light 74 to the LCD 34 along optical axis A. As with active displays 20 and 56, images illuminated on LCD 34 are projected by projection lens 36 onto screen 16 via mirror 38. Light source 24 can be an LED and can be either a green, red or blue light source, or include all three colors. In addition, light source 24 can be a white light source, such as a white LED, for example, Lumileds part No. LXHL-MW1A. The LCD 34 can be a color filter LCD. Active display 60 has less components than displays 20 and 56. However, with a color filter, active display 60 has a lower resolution and a color triad pixel, but is typically sufficient for instrument panel use.

Although displays 20, 56 and 60 have been shown to have a mirror 38, in some embodiments it may be desirable to omit the mirror 38 and position the screen 16 along optical axis A. In addition, the light sources can be positioned along other suitable axes than those shown. Depending upon the spacing of the light sources from LCD 34, as well as the component sizes, the condenser lenses 30 can be omitted with the hollow lenses 28 providing sufficient optics for the light collection lens systems. Furthermore, in some situations, the dispersion lens 58 can be omitted. Although hollow lens 28 is preferably hyperspheroid, alternatively, hollow lens 28 can have other shapes to suit the situation at hand. It is also contemplated that light sources other than LEDs can be employed depending upon the brightness and projection size desired.

Figure 9:
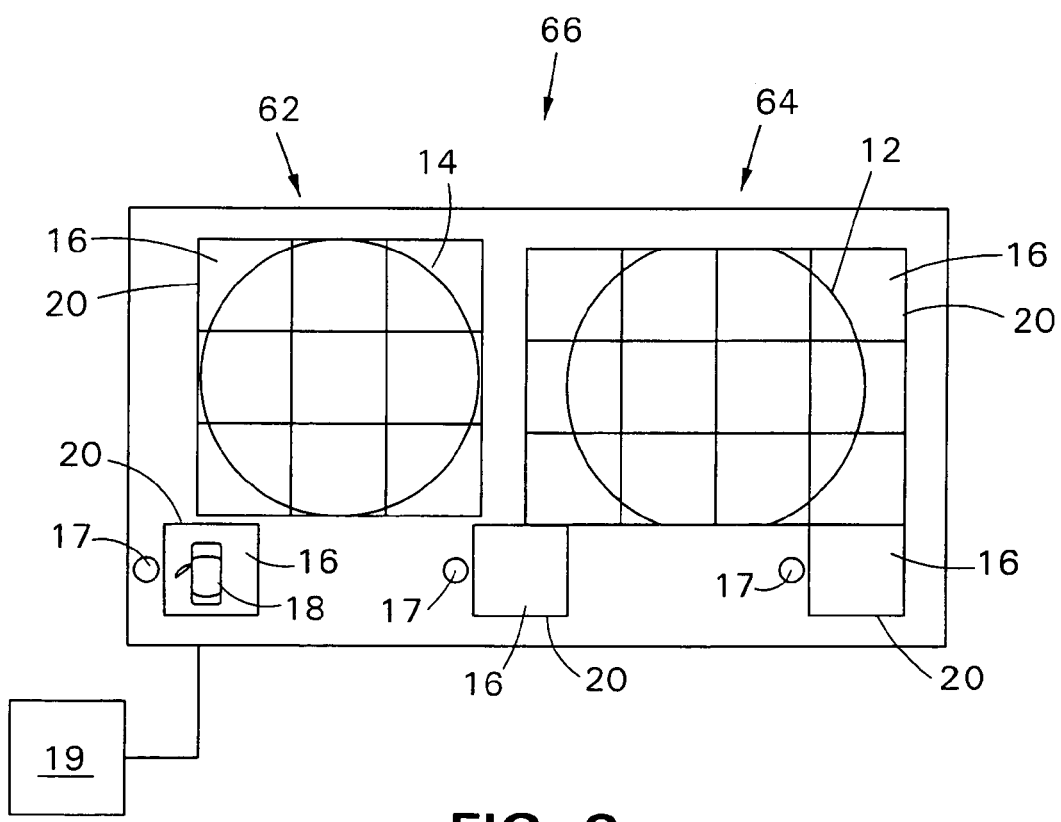
FIG. 9 is a simplified front view of another embodiment of an instrument panel in accordance with the present invention.

Referring to FIG. 9, instrument panel 66 is another embodiment of the present invention which differs from instrument panel 10 in that instrument panel 66 includes multiple active displays 20 as shown (or alternatively, displays 56 and 60). Instrument panel 66 has multiple displays 20 for simultaneously displaying multiple icons 18, gauges or information. In addition, instrument panel 66 does not have actual gauges in the panel but instead has operating representations of gauges such as speedometer/odometer 12 and tachometer 14 which are displayed on display regions 64 and 62. The display regions 64 and 62 are each formed by multiple displays 20 that are positioned adjacent to each other to form a display mosaic. If desired, the whole instrument panel 66 can be formed of displays 20. Alternatively, the instrument panel 66 can be formed from a single screen of a projection display. In such a case, the light sources can be selected to have sufficient brightness to suit the size of the projection.

While this invention has been particularly shown and described with references to preferred embodiments thereof, it will be understood by those skilled in the art that various changes in form and details may be made therein without departing from the scope of the invention encompassed by the appended claims.

For example, features of the various embodiments shown and described can be omitted or combined. In addition, although some dimensions for components have been provided, it is understood that such dimensions can change depending upon the situation at hand. Furthermore, although the preferred embodiments of the display systems include an active LCD, alternatively, some embodiments can have a series of still images that are selected for illuminated viewing. Also, in some embodiments, the images formed do not have to be enlarged by projection. Finally, more than one light source of the same color can be employed to increase brightness.

What is claimed is:

1. A display system comprising:
   a display device for providing images;
   a first light source for emitting light; and
   a first light collection lens system comprising a hyperspheroid hollow lens having an optical axis, the hollow lens for collecting the light emitted from the first light source and directing the light in a first beam of light to the display device for illuminating the images on the display device for viewing, the hollow lens having a substantially spherical interior portion and an outer surface bulging forward along the optical axis relative to the substantially spherical interior portion, the first light source extending within the substantially spherical interior portion.

2. The display system of claim 1 in which the display device is an active liquid crystal display.

3. The display system of claim 2 in which the first light source is an LED.

4. The display system of claim 3 in which the hollow lens is substantially spherical with an opening on one side.

5. The display system of claim 4 in which the hollow lens has spherically shaped inner and outer surfaces with centers offset from each other.

6. The display system of claim 5 further comprising a projection lens for projecting images from the liquid crystal display.

7. The display system of claim 6 further comprising a screen for displaying the images projected by the projection lens.

8. The display system of claim 7 in which the first light collection lens system further comprises a condenser lens positioned adjacent to the hollow lens for further condensing the first beam of light.

9. The display system of claim 8 further comprising a dispersion lens positioned adjacent to the liquid crystal display for dispersing the first beam of light on the liquid crystal display.

10. The display system of claim 9 further comprising:
    a second light source comprising an LED for emitting light, the light from the first and second light sources being different colors;
    a second light collection lens system comprising a hollow lens for collecting the light emitted from the second light source and directing the light in a second beam of light, and a condenser lens positioned adjacent to the hollow lens for further condensing the second beam of light; and
    a beam splitter for directing the second beam of light through the dispersion lens to the liquid crystal display.

11. The display system of claim 10 further comprising a mirror for directing images projected by the projection lens onto the screen.

12. The display system of claim 10 in which one of the first and second light sources emits green light at about 530 nm and the other emits red light at about 645 nm.

13. The display system of claim 10 in which the display system is contained within a housing, the housing being about 3.5 inches long, 1.5 inches high and 1 inch wide.

14. The display system of claim 13 in which the screen is about 1×1.3 inches and the displayed images have a dimension of at least 3×4 inches.

15. The display system of claim 10 further comprising:
a third light source comprising an LED for emitting light, the light from the first, second and third light sources being different colors;
a third light collection lens system comprising a hollow lens for collecting the light emitted from the third light source and directing the light in a third beam of light, and a condenser lens positioned adjacent to the hollow lens for further condensing the third beam of light; and
wherein the beam splitter also directs the third beam of light through the dispersion lens to the liquid crystal display.

16. The display system of claim 15 in which the different colors are green, red and blue.

17. A method of displaying images with a display system comprising:
providing the images with a display device;
emitting light with a first light source; and
collecting the light emitted from the first light source and directing the light in a first beam of light to the display device with a first light collection lens system comprising a hyperspheroid hollow lens having an optical axis, the hollow lens for illuminating the images on the display device for viewing, the hollow lens having a substantially spherical interior portion and an outer surface bulging forward along the optical axis relative to the substantially spherical interior portion, the first light source extending within the substantially spherical interior portion.

18. The method of claim 17 further comprising providing the display device with an active liquid crystal display.

19. The method of claim 18 further comprising forming the first light source from an LED.

20. The method of claim 19 further comprising forming the hollow lens to be substantially spherical with an opening on one side.

21. The method of claim 20 further comprising providing the hollow lens with spherically shaped inner and outer surfaces having centers offset from each other.

22. The method of claim 21 further comprising projecting images from the liquid crystal display with a projection lens.

23. The method of claim 22 further comprising displaying the images projected by the projection lens on a screen.

24. The method of claim 23 further comprising providing the first light collection lens system with a condenser lens positioned adjacent to the hollow lens for further condensing the first beam of light.

25. The method of claim 24 further comprising positioning a dispersion lens adjacent to the liquid crystal display for dispersing the first beam of light on the liquid crystal display.

26. The method of claim 25 further comprising:
emitting light with a second light source comprising an LED, the light from the first and second light sources being different colors;
collecting the light emitted from the second light source and directing the light in a second beam of light with a second light collection lens system comprising a hollow lens and a condenser lens positioned adjacent to the hollow lens for further condensing the second beam of light; and
directing the second beam of light through the dispersion lens to the liquid crystal display with a beam splitter.

27. The method of claim 26 further comprising directing images projected by the projection lens onto the screen with a mirror.

28. The method of claim 26 further comprising emitting green light at about 530 nm with one of the first and second light sources and emitting red light at about 645 nm with the other light source.

29. The method of claim 26 further comprising containing the display system within a housing, the housing being about 3.5 inches long, 1.5 inches high and 1 inch wide.

30. The method of claim 29 further comprising forming the screen to be about 1×1.3 inches and the displayed images having a dimension of at least 3×4 inches.

31. The method of claim 26 further comprising:
emitting light with a third light source comprising an LED, the light from the first, second and third light sources being different colors;
collecting the light emitted from the third light source and directing the light in a third beam of light with a third light collection lens system comprising a hollow lens and a condenser lens positioned adjacent to the hollow lens for further condensing the third beam of light; and
directing the third beam of light through the dispersion lens to the liquid crystal display with the beam splitter.

32. The method of claim 31 further comprising providing green, red and blue as the different colors.

* * * * *